(12) United States Patent
Lai et al.

(10) Patent No.: US 10,742,668 B2
(45) Date of Patent: Aug. 11, 2020

(54) NETWORK ATTACK PATTERN DETERMINATION APPARATUS, DETERMINATION METHOD, AND NON-TRANSITORY COMPUTER READABLE STORAGE MEDIUM THEREOF

(71) Applicant: Institute For Information Industry, Taipei (TW)

(72) Inventors: Chia-Min Lai, New Taipei (TW); Ching-Hao Mao, Taipei (TW); Chih-Hung Hsieh, Taoyuan (TW); Te-En Wei, Taipei (TW); Chi-Ping Lai, Taichung (TW)

(73) Assignee: Institute For Information Industry, Taipei (TW)

( * ) Notice: Subject to any disclaimer, the term of this patent is extended or adjusted under 35 U.S.C. 154(b) by 220 days.

(21) Appl. No.: 15/372,294

(22) Filed: Dec. 7, 2016

(65) Prior Publication Data

US 2018/0159868 A1     Jun. 7, 2018

(30) Foreign Application Priority Data

Dec. 5, 2016    (TW) .............................. 105140086 A

(51) Int. Cl.
*G06F 7/04*        (2006.01)
*H04L 29/06*     (2006.01)
(Continued)

(52) U.S. Cl.
CPC ........ *H04L 63/1416* (2013.01); *G06F 21/552* (2013.01); *H04L 9/3297* (2013.01); *H04L 63/0876* (2013.01); *H04L 63/164* (2013.01)

(58) Field of Classification Search
CPC .......... G06F 21/50; G06F 21/55; G06F 21/56; H04L 63/0876; H04L 63/1416; H04L 63/164; H04L 9/3297
(Continued)

(56) References Cited

U.S. PATENT DOCUMENTS

| 6,405,318 | B1 * | 6/2002 | Rowland | ............... G06F 21/552 |
| | | | | 726/22 |
| 7,043,755 | B1 * | 5/2006 | Roger | ................... G06F 21/552 |
| | | | | 707/999.001 |

(Continued)

FOREIGN PATENT DOCUMENTS

| CN | 101242278 A | 8/2008 |
| CN | 101741633 A | 6/2010 |

(Continued)

OTHER PUBLICATIONS

Office Action to U.S. Appl. No. 15/372,235, whose inventors are the same as those of the subject patent application, rendered by the United States Patent and Trademark Office (USPTO) dated Jul. 25, 2018, 20 pages.

(Continued)

*Primary Examiner* — Gary S Gracia
(74) *Attorney, Agent, or Firm* — Skaar Ulbrich Macari, P.A.

(57) ABSTRACT

A network attack pattern determination apparatus, method, and non-transitory computer readable storage medium thereof are provided. The apparatus is stored with several attack patterns and access records. Each access record includes a network address, time stamp, and access content. Each attack pattern corresponds to at least one attack access relation. Each attack access relation is defined by a network address and access content. The apparatus retrieves several attack records according to at least one attack address. The network address of each attack record is one of the attack (Continued)

address(s). The apparatus divides the attack records into several groups according to the time stamps and performs the following operations for each group: (a) creating at least one access relation for each attack address included in the group and (b) determining that the group corresponds to one of the attack patterns according to the at least one access relation of the group.

14 Claims, 5 Drawing Sheets

(51) Int. Cl.
*G06F 21/55* (2013.01)
*H04L 9/32* (2006.01)
*G06F 15/16* (2006.01)

(58) Field of Classification Search
USPC .......................... 703/13; 709/224; 726/4, 23
See application file for complete search history.

(56) References Cited

U.S. PATENT DOCUMENTS

| | | | |
|---|---|---|---|
| 8,185,540 B2* | 5/2012 | Dieberger | G06F 11/324 707/757 |
| 8,607,351 B1* | 12/2013 | Wang | G06F 21/577 726/22 |
| 9,900,344 B2* | 2/2018 | Smith | H04L 63/1458 |
| 10,135,865 B2* | 11/2018 | Smith | H04L 63/1458 |
| 10,511,625 B2* | 12/2019 | Smith | H04L 63/1458 |
| 2002/0166063 A1 | 11/2002 | Lachman, III et al. | |
| 2006/0010389 A1 | 1/2006 | Rooney et al. | |
| 2009/0070872 A1 | 3/2009 | Cowings et al. | |
| 2009/0249184 A1* | 10/2009 | Dieberger | G06F 11/324 715/227 |
| 2009/0276389 A1 | 11/2009 | Constantine et al. | |
| 2009/0319247 A1* | 12/2009 | Ratcliffe, III | H04L 63/1433 703/13 |
| 2011/0125750 A1* | 5/2011 | Dieberger | G06F 16/248 707/737 |
| 2012/0173710 A1* | 7/2012 | Rodriguez | H04L 43/04 709/224 |
| 2013/0227687 A1 | 8/2013 | Lee | |
| 2014/0283085 A1 | 9/2014 | Maestas | |
| 2016/0021141 A1* | 1/2016 | Liu | H04L 63/1433 726/23 |
| 2016/0127406 A1* | 5/2016 | Smith | H04L 63/1458 726/23 |
| 2016/0301704 A1 | 10/2016 | Hassanzadeh et al. | |
| 2017/0026391 A1* | 1/2017 | Abu-Nimeh | G06F 21/552 |
| 2017/0063886 A1 | 3/2017 | Muddu et al. | |
| 2019/0089734 A1* | 3/2019 | Smith | H04L 63/1458 |

FOREIGN PATENT DOCUMENTS

| | | |
|---|---|---|
| CN | 102611713 A | 7/2012 |
| CN | 103297972 A | 9/2013 |
| CN | 104601591 A | 5/2015 |
| EP | 2009864 A1 | 12/2008 |
| TW | 200516893 A | 5/2005 |
| TW | 200833015 A | 8/2008 |
| TW | 201445962 A | 12/2014 |
| WO | 2016073457 A2 | 5/2016 |

OTHER PUBLICATIONS

The extended European Search Report rendered by the European Patent Office for European Patent Application No. 16202638.9, dated Feb. 13, 2017, 7 pages.

Magnus Almgren et al., "A Lightweight Tool for Detecting Web Server Attacks", Internet citation 2000 XP002375914, retrieved from the internet: URL:http://www.isoc.org/isoc/conferences/ndss/2000/proceedings/007.pdf, retrieved on Apr. 5, 2006, 14 pages.

Jens Müller, "Web Application Forensics Implementation of a Framework for Advanced HTTPD Logfile Security Analysis", retrieved from the internet: URL:http://homepage.ruhr-uni-bochum.de/jens.mueller-2/publications/2012-web-application-forensics.pdf, retrieved on Jan. 27, 2017, dated Dec. 24, 2012, 68 pages.

Ching-Hao Mao et al., "EigenBot", Proceedings of the ACM SIGKDD Workshop on Intelligence and Security Informatics, ISI-KDD '12, Aug. 12, 2012, 8 pages.

The extended European Search Report rendered by the European Patent Office for European Patent Application No. 16202618.1, dated Feb. 13, 2017, 6 pages.

Li Wang et al., "Automatic Multi-step Attack Pattern Discovering", International Journal of Network Security, vol. 10, No. 2, pp. 142-152, retrieved from the internet: URL:http://ijns.femto.com.tw/contents/ijns-v10-n2/ijns-2010-v10-n2-p142-152.pdf, retrieved on Feb. 2, 2017, dated Mar. 2010, 6 pages.

Office Action to the corresponding Taiwan Patent Application No. 105139679 rendered by the Taiwan Intellectual Property Office (TIPO) dated Jul. 21, 2017, 17 pages (including English translation).

Office Action to Chinese Patent Application No. 201611113971.2 rendered by the China National Intellectual Property Administration (CNIPA) dated Apr. 28, 2019, 17 pages (including English translation).

Office Action to the corresponding Chinese Patent Application No. 201611114396.8 rendered by the China National Intellectual Property Administration (CNIPA) dated May 7, 2019, 10 pages (including English translation).

Office Action to Chinese Patent Application No. 201611113971.2 rendered by the China National Intellectual Property Administration (CNIPA) dated Feb. 3, 2020, 14 pages (including English translation).

* cited by examiner

FIG. 1B

NETWORK ATTACK PATTERN DETERMINATION APPARATUS, DETERMINATION METHOD, AND NON-TRANSITORY COMPUTER READABLE STORAGE MEDIUM THEREOF

PRIORITY

This application claims priority to Taiwan Patent Application No. 105140086 filed on Dec. 5, 2016, which is hereby incorporated by reference in its entirety.

FIELD

The present invention relates to a network attack pattern determination apparatus, a network attack pattern determination method, and a non-transitory computer readable storage medium thereof. More particularly, the present invention relates to a network attack pattern determination apparatus, a network attack pattern determination method, and a non-transitory computer readable storage medium thereof that determine and predict a network attack pattern according to access records.

BACKGROUND

With rapid advancement of the science and technologies, computers and networks have become indispensable to government and enterprise's operations as well as people's daily life. For various kinds of purposes, hackers attack servers and/or computers on the networks. Generally speaking, attacks from the hackers may be divided into two categories, including destroying attacks and intrusion attacks. The destroying attacks aim at destroying the attacked targets so that the attacked targets fail to operate normally. The intrusion attacks aim at acquiring some authorities of the attacked targets so as to control the attacked targets to execute specific operations. The intrusion attacks are usually performed in the loopholes of servers, application software, or network communication protocols.

To prevent the computers on the network from being attacked by hackers, some conventional technologies adopt the filtering rules designed by experts. Specifically, the administrator uses a predetermined filtering list to filter the accessing apparatuses so as to maintain the information security. The filtering list may include Internet Protocol (IP) addresses to be filtered or feature values of program codes of malicious software. Nevertheless, the filtering list cannot be updated in real time and, hence, there is still a window that the maintenance of information security is vulnerable. Some conventional technologies adopt the mechanism of dynamic real-time scanning (e.g., scanning webpage contents), which shortens the window that the maintenance of information security is vulnerable but consumes a lot of computing resources. None of these conventional technologies is able to provide users with the attack pattern(s) for reference. In addition, none of these conventional technologies is able to predict an attack pattern that will possibly occur in the future for purpose of prevention beforehand. Accordingly, a technology capable of effectively determining and predicting an attack pattern is still need in the art.

SUMMARY

The disclosure includes a network attack pattern determination apparatus. The determination apparatus comprises a storage unit and a processing unit, wherein the processing unit is electrically connected to the storage unit. The storage unit is stored with a plurality of attack patterns and a plurality of access records of a network node. Each of the access records comprises a network address of a host, a time stamp of an access to the network node by the host, and an access content of the access to the network node by the host. Each of the attack patterns corresponds to at least one attack access relation, wherein each of the at least one attack access relation is defined by one of the network addresses and one of the access contents. The processing unit retrieves a subset of the access records as a plurality of attack records according to at least one attack address, wherein the network address comprised in each of the attack addresses is one of the at least one attack address. The processing unit further divides the attack records into a plurality of groups according to the time stamps of the attack records and performs the following operations on each of the groups: (a) creating at least one access relation for each of the attack addresses included in the group according to the attack records included in the group, wherein each of the at least one access relation is defined by one of the at least one attack address included in the group and one of the access contents of the attack records included in the group and (b) determining that the group corresponds to a specific attack pattern among the attack patterns according to the at least one access relation corresponding to the group.

The disclosure also includes a network attack pattern determination method, which is adapted for an electronic computing apparatus. The electronic computing apparatus is stored with a plurality of attack patterns and a plurality of access records of a network node. Each of the access records comprises a network address of a host, a time stamp of an access to the network node by the host, and an access content of the access to the network node by the host. Each of the attack patterns corresponds to at least one attack access relation, wherein each of the at least one attack access relation is defined by one of the network addresses and one of the access contents. The network attack pattern determination method comprises the following steps of: (a) retrieving a subset of the access records as a plurality of attack records according to at least one attack address, wherein the network address comprised in each of the attack addresses is one of the at least one attack address, (b) dividing the attack records into a plurality of groups according to the time stamps of the attack records, and (c) executing the following steps on each of the groups: (c1) creating at least one access relation for each of the at least one attack address included in the group according to the attack records included in the group, wherein each of the at least one access relation is defined by one of the at least one attack address included in the group and one of the access contents of the attack records included in the first group, and (c2) determining that the group corresponds to a specific attack pattern among the attack patterns according to the at least one access relation corresponding to the group.

The disclosure further includes a non-transitory computer readable storage medium, which comprises a computer program stored therein. An electronic computing apparatus is stored with a plurality of attack patterns and a plurality of access records of a network node. Each of the access records comprises a network address of a host, a time stamp of an access to the network node by the host, and an access content of the access to the network node by the host. Each of the attack patterns corresponds to at least one attack access relation, wherein each of the at least one attack access relation is defined by one of the network addresses and one of the access contents. When the computer program is loaded into the electronic computing apparatus, the computer program executes the aforesaid network attack pattern determination method.

Under conditions that at least one attack address is known, the network attack pattern determination technology (including the apparatus, the method, and the non-transitory computer readable storage medium thereof) provided in the present invention retrieves a plurality of attack records related to the at least one attack address, divides the attack records into a plurality of groups, and compares access relations corresponding to each of the groups with attack access relations of the attack patterns. Through the aforesaid operations, the present invention can determine attack patterns corresponding to each group and even further predict attack patterns that will possibly occur in the future.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1B illustrates an example of the access records 10a, . . . , 10b;

DETAILED DESCRIPTION

In the following description, a network attack pattern determination apparatus, a network attack pattern determination method, and a non-transitory computer readable storage medium thereof according to the present invention will be explained with reference to example embodiments thereof. However, these example embodiments are not intended to limit the present invention to any particular example, embodiment, environment, applications, or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction. In addition, dimensions of and dimensional relationships among individual elements in the attached drawings are provided only for illustration but not to limit the scope of the present invention.

Figure 1A:
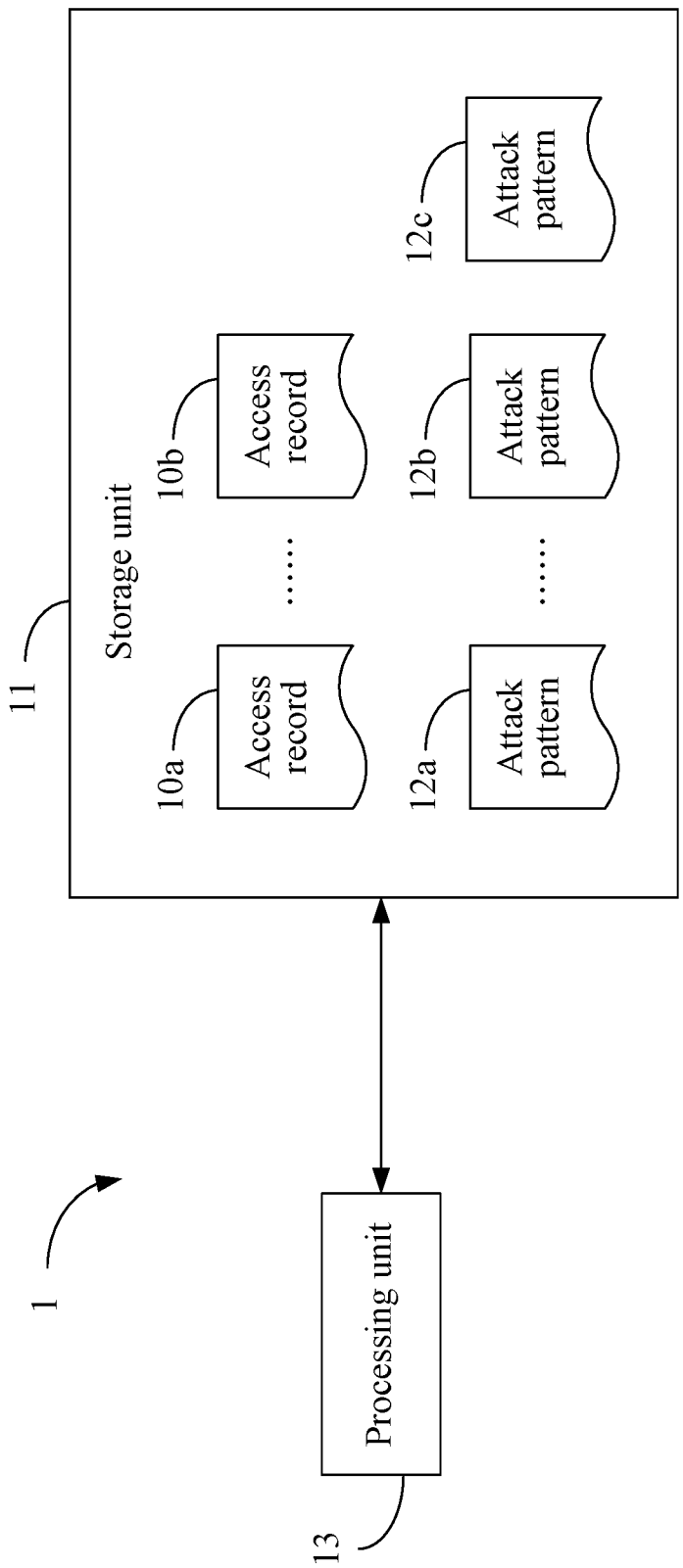
FIG. 1A illustrates a schematic view of a network attack pattern determination apparatus 1 of the first embodiment.

A first embodiment of the present invention is a network attack pattern determination apparatus 1, wherein a schematic view of which is illustrated in FIG. 1A. The network attack pattern determination apparatus 1 comprises a storage unit 11 and a processing unit 13, wherein the processing unit 13 is electrically connected to the storage unit 11. The storage unit 11 may be a memory, a Universal Serial Bus (USB) disk, a hard disk, a Compact Disk (CD), a mobile disk, a magnetic disk, a database, or any other storage medium or circuit known to those of ordinary skill in the art and having the same functionality. The processing unit 13 may be any of various processors, Central Processing Units (CPUs), microprocessors, or other computing apparatuses known to those of ordinary skill in the art.

The storage unit 11 is stored with a plurality of access records 10a, . . . , 10b of a network node (i.e., access records regarding other hosts access the network node). The network node may be the network attack pattern determination apparatus 1 or some other network node in a network system. For example, the network node may be a server (e.g., a network server). Each of the access records 10a, . . . , 10b comprises a network address of a host, a time stamp of an access to the network node by the host, and an access content of the access to the network node by the host. In some embodiments, each of the access contents may be a HyperText Transfer Protocol (HTTP) request, an access status code, and/or a data access amount. It shall be appreciated that the content of an HTTP request is well known to those of ordinary skill in the art, so the details are not described herein. Additionally, an access status code comprised in an access record represents the result of the access (e.g., successful access, failed success, webpage not found). Furthermore, a data access amount in an access record represents the data amount downloaded by the host during the access.

For ease of understanding, please refer to an example of the access records 10a, . . . , 10b illustrated in FIG. 1B. In this example, the access record 10a comprises a network address (i.e., fcrawler.looksmart.com), a time stamp (i.e., 26/Apr/2000:00:00:12), an HTTP request (i.e., GET/contacts.html), an access status code (i.e., 200, which represents a successful access), and a data access amount (i.e., 4,595 bytes). The access record 10b comprises a network address (i.e., 123.123.123.123), a time stamp (i.e., 26/Apr/2000:00:23:51), an HTTP request (i.e., GET/pics/a2hlogo.jpg), an access status code (i.e., 200, which represents a successful access), and a data access amount (i.e., 4,282 bytes). It shall be appreciated that the access records 10a, . . . , 10b depicted in FIG. 1B are provided only for purpose of illustration but not to limit the scope of the present invention.

In this embodiment, the storage unit 11 is also stored with a plurality of attack patterns 12a, . . . , 12b, 12c. Each of the attack patterns 12a, . . . , 12b, 12c corresponds to at least one attack access relation, wherein each of the at least one attack access relation is defined by one of the network addresses comprised in the access records 10a, . . . , 10b and one of the access contents comprised in the access records 10a, . . . , 10b. More specifically, each of the at least one attack access relation is defined by the network address and the access content of one of the access records 10a, . . . , 10b. For example, if an expert of network information security determines that the access record 10a is related to the attack pattern 12a (e.g., the expert of network information security determines that there is a network attack event within a certain time interval and that the access record 10a is related to the network attack event, and the network attack event is named as the attack pattern 12a), the attack pattern 12a may correspond to a first attack access relation defined by the network address and the file (e.g., a2hlogo.jpg) in the HTTP request of the access record 10a, a second attack access relation defined by the network address and the access status code of the access record 10a, and/or a third attack access relation defined by the network address and the data access amount of the access record 10a. According to the above descriptions, the attack access relations corresponding to an attack pattern can reflect access modes possibly involved in the attack pattern. It shall be appreciated that it is possible that no attack pattern is stored in the storage unit 11 at the beginning.

In this embodiment, the network attack pattern determination apparatus 1 has known at least one attack address (i.e., has known that each of the at least one attack address is a network address that had once attacked a network node or that will possibly attack a network node). It shall be appreciated that the present invention focuses on how to determine and predict a network attack pattern according to at least one attack address. As to how to obtain the at least one attack address, it is not the focus of the present invention will not be detailed herein.

Then the processing unit 1 determines which attack pattern(s) is related to the at least one attack address. Specifically, the processing unit 13 retrieves a subset of the access records 10a, . . . , 10b from the storage unit 11 as a plurality of attack records according to the at least one attack address, wherein the network address comprised in each of the attack records is one of the at least one attack address. In other words, from the access records 10a, . . . , 10b, the processing unit 13 selects the access record(s) whose network addresses are identical to the at least one attack address and treats the selected access records as the attack records.

Figure 1C:
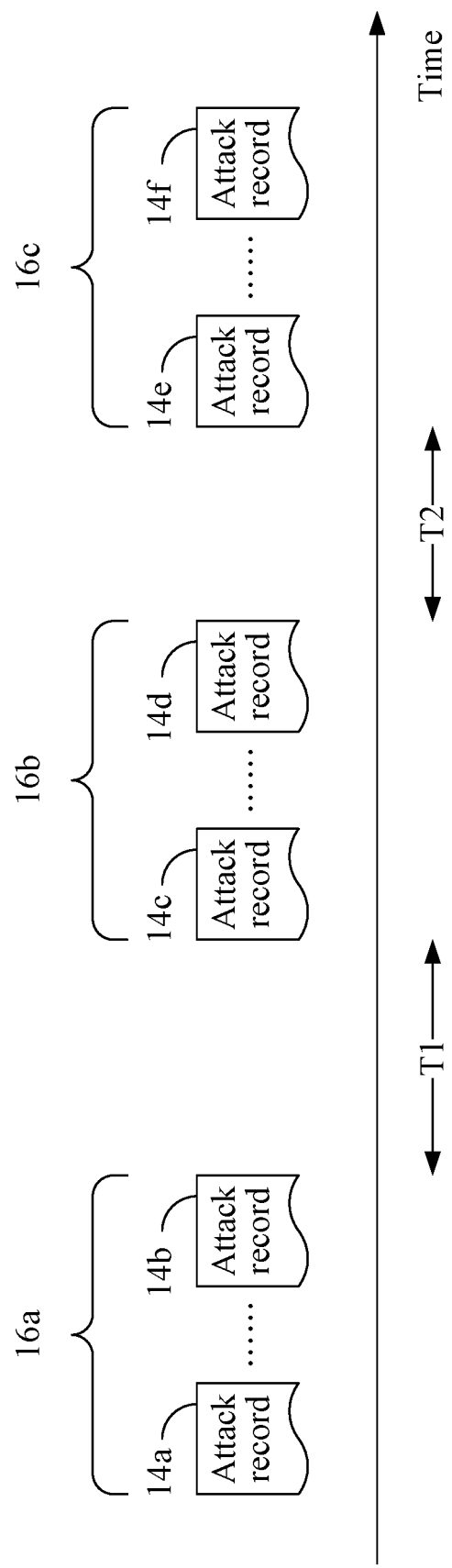
FIG. 1C illustrates an example of the first groups 16a, 16b, 16c.

Then, the processing unit 13 divides the attack records into a plurality of first groups according to the time stamps of the attack records. In some embodiments, the processing unit 13 calculates a total time length covered by all the attack records according to the time stamps of the attack records and divides the total time length into a plurality of time intervals whose time lengths are identical. For those embodiments, the attack records corresponding to each of the time intervals form one of the first groups. In some embodiments, the processing unit 13 divides the attack records into a plurality of first groups according to clustering properties of the time stamps of the attack records. For those embodiments, the first groups have a sequence, each of the first groups corresponds to a time interval, and a time span between any two adjacent first groups is greater than a threshold. For ease of understanding, please refer to an example depicted in FIG. 1C. In FIG. C, the horizontal axis represents the time. The attack records 14a, . . . , 14b belong to the first group 16a, the attack records 14c, . . . , 14d belong to the first group 16b, and the attack records 14e, . . . , 14f belong to the first group 16c. The first group 16a and the first group 16b are adjacent to each other, wherein a time span T1 between the first group 16a and the first group 16b is greater than the threshold. The first group 16b and the first group 16c are adjacent to each other and a time span T2 between the first group 16b and the first group 16c is greater than the threshold.

Next, the processing unit 13 determines to which attack pattern each of the first groups belongs. For ease of understanding, the following description will be made with reference to FIG. 1C as an example. Taking the first group 16a as an example, the processing unit 13 creates at least one access relation for each of the at least one attack address included in the first group 16a (i.e., each of the network addresses included in the attack records 14a, . . . , 14b) according to the attack records 14a, . . . , 14b included in the first group 16a. Each of the at least one access relation is defined by one of the at least one attack address included in the first group 16a and one of the access contents of the attack records 14a, . . . , 14b included in the first group 16a. Specifically, each of the at least one access relation is defined by the network address and the access content of one of the attack records 14a, . . . , 14b.

Afterwards, the processing unit 13 determines whether the first group 16a corresponds to a specific attack pattern among the attack patterns 12a, . . . , 12b, 12c according to the at least one access relation corresponding to the first group 16a. As an example, the processing unit 13 may calculates a similarity between the access relation corresponding to the first group 16a and the attack access relation corresponding to each of the attack patterns 12a, . . . , 12b, 12c and compares the similarities with a threshold individually. If there is any similarity (similarities) greater than the threshold, the processing unit 13 selects the attack pattern corresponding to the greatest similarity as the attack pattern corresponding to the first group 16a. As another example, the processing unit may present the at least one access relation corresponding to the first group 16a in graph, present the attack access relation corresponding to each of the attack patterns 12a, . . . , 12b, 12c in other graphs, and calculate a graph edit distance between the graph of the first group and the other graphs individually. If there is any graph edit distance(s) smaller than a threshold, the processing unit 13 selects the attack pattern corresponding to the smallest graph edit distance as the attack pattern corresponding to the first group 16a. If the processing unit 13 determines that the first group 16a does not correspond to any of the attack patterns 12a, . . . , 12b, 12c, the at least one access relation corresponding to the first group 16a may be provided (e.g., transmitted via a transceiving interface, displayed on a display apparatus) to an expert of network information security for determination. Then, the storage unit 11 may further record that the attack pattern determined by the expert of network information security corresponds to the at least one access relation corresponding to the first group 16a. In this embodiment, the processing unit 13 will perform similar operations on the first groups 16b, 16c. How the processing unit 13 performs similar operations on the first groups 16b, 16c shall be understood by those of ordinary skill in the art from the aforesaid description, so this will not be further described herein.

In some embodiments, the processing unit 13 may further store a sequence of the specific attack patterns corresponding to the first groups into the storage unit 11. For ease of understanding, the following description will be made with reference to FIG. 1C as an example. It is hereby assumed that the first group 16a corresponds to the attack pattern 12b, the first group 16b corresponds to the attack pattern 12c, and the first group 16c corresponds to the attack pattern 12a. Since the first groups 16a, 16b, 16c have a sequence, the attack patterns 12b, 12c, 12a recorded by the processing unit 13 into the storage unit 11 also have a sequence (i.e., the attack pattern 12c appears after the attack pattern 12b and the attack pattern 12a appears after the attack pattern 12c).

In some embodiments, the processing unit 11 further processes a plurality of to-be-tested access records (not shown) comprised in a second group (not shown), where each of the to-be-tested access records comprises a network address, a time stamp, and an access content. In some embodiments, each of the access contents is an HTTP request, an access status code, and/or a data access amount. Specifically, the processing unit 11 creates at least one to-be-tested access relation for each of the at least one network address included in the second group according to the to-be-tested access records. Each of the at least one to-be-tested access relation is defined by one of the at least one network address included in the second group and one of the access contents of the to-be-tested access records included in the second group. Specifically, each of the at least one to-be-tested access relation is defined by the network address and the access content of one of the to-be-tested access records.

Then, the processing unit 13 determines whether the second group corresponds to a specific attack pattern among the attack patterns 12a, . . . , 12b, 12c according to the to-be-tested access relations. How the processing unit 13 determines whether the second group corresponds to a specific attack pattern among the attack patterns 12a, . . . , 12b, 12c according to the to-be-tested access relations shall be understood by those of ordinary skill in the art from the above description related to the first group, so the details will not be further described herein. It is hereby assumed that the processing unit 13 determines that the second group corresponds to the attack pattern 12b. The processing unit 13 further determines that a sequence of the attack patterns 12b, 12c, 12a has been recorded in the storage unit 11, so the processing unit 13 further predicts that another time interval subsequent to the time interval corresponding to the second group will correspond to the attack pattern 12c according to the sequence of the attack patterns 12b, 12c, 12a.

According to the above descriptions, under conditions that at least one attack address is known, the network attack pattern determination apparatus 1 retrieves a plurality of attack records related to the at least one attack address, divides the attack records into a plurality of groups, and compares access relations corresponding to each of the groups with attack access relations of the attack patterns. Through the aforesaid operations, the network attack pattern determination apparatus 1 can determine attack patterns corresponding to each group and even further predict attack patterns that will possibly occur in the future.

Figure 2A:
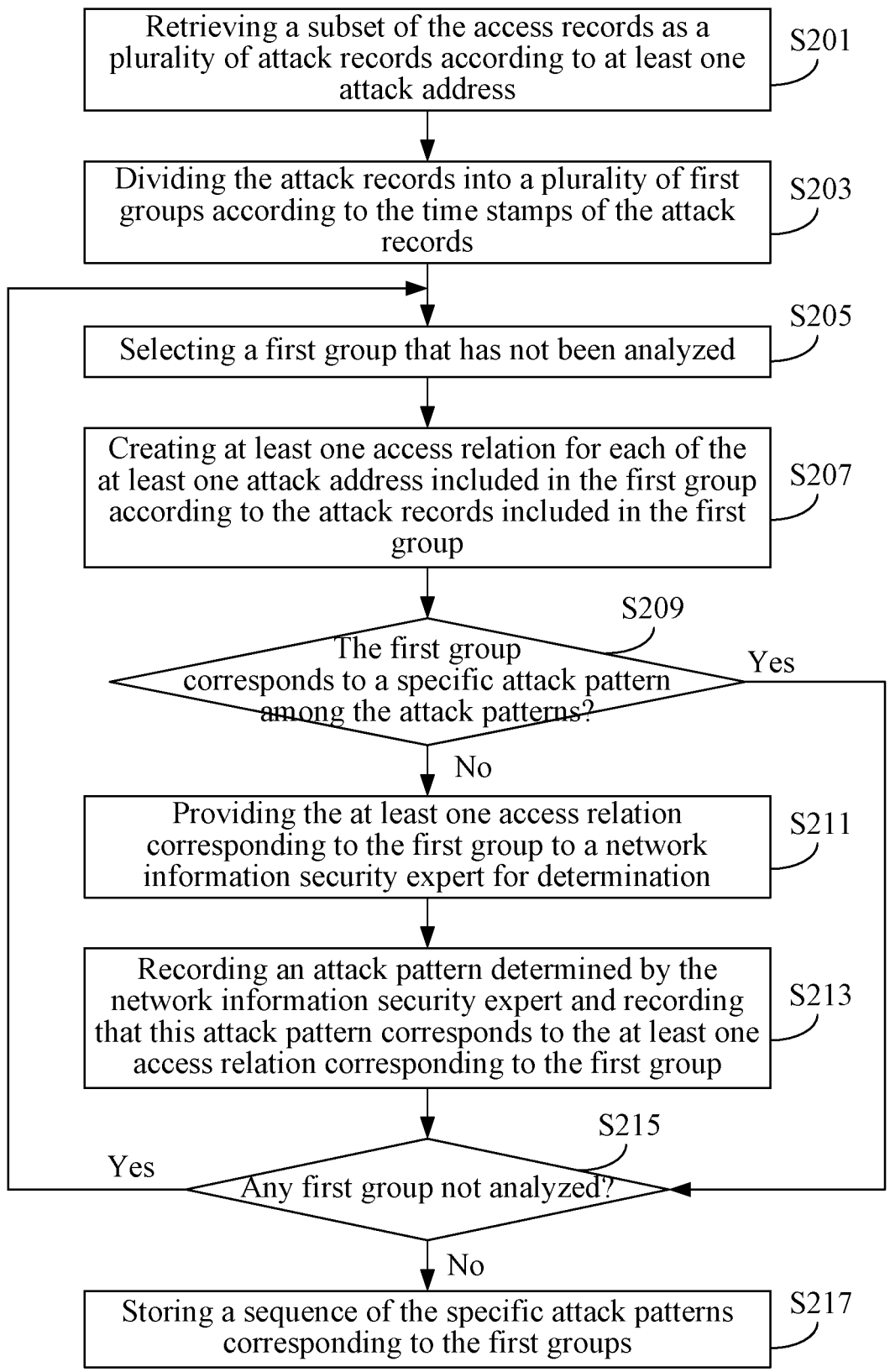
FIG. 2A illustrates a flowchart of the network attack pattern determination method of the second embodiment.

A second embodiment of the present invention is a network attack pattern determination method and a flowchart of which is depicted in FIG. 2A. The network attack pattern determination method is adapted for an electronic computing apparatus (e.g., the network attack pattern determination apparatus 1 of the first embodiment). The electronic computing apparatus is stored with a plurality of access records of a network node, wherein each of the access records comprises a network address of a host, a time stamp of an access to the network node by the host, and an access content of the access to the network node by the host. In some embodiments, each of the access contents is an HTTP request, an access status code, and/or a data access amount. The electronic computing apparatus is also stored with a plurality of attack patterns. Each of the attack patterns corresponds to at least one attack access relation, wherein each of the at least one attack access relation is defined by one of the network addresses and one of the access contents.

In this embodiment, the electronic computing apparatus has known at least one attack address (i.e., has known that each of the at least one attack address is a network address that had once attacked a network node or that will possibly attack a network node). In step S201, the electronic computing apparatus retrieves a subset of the access records as a plurality of attack records according to the at least one attack address, wherein the network address comprised in each of the attack addresses is one of the at least one attack address.

In step S203, the electronic computing apparatus divides the attack records into a plurality of first groups according to the time stamps of the attack records. In some embodiments, the step S203 calculates a total time length covered by the attack records according to the time stamps of the attack records and divides the total time length into a plurality of time intervals whose time lengths are identical. For those embodiments, the attack records corresponding to each of the time intervals form one of the first groups. In some embodiments, the step 203 divides the attack records into a plurality of first groups according to clustering properties of the time stamps of the attack records. For those embodiments, the first groups have a sequence, each of the first groups corresponds to a time interval, and a time span between any two adjacent first groups is greater than a threshold.

Then, step S205 to step S215 are executed by the electronic computing apparatus on each of the first groups. In the step S205, the electronic computing apparatus selects a first group that has not been analyzed. In step S207, the electronic computing apparatus creates at least one access relation for each of the at least one attack address included in the first group according to the attack records included in the first group. Each of the at least one access relation is defined by one of the at least one attack address included in the first group and one of the access contents of the attack records included in the first group. In step S209, the electronic computing apparatus determines whether the first group corresponds to a specific attack pattern among the attack patterns stored in the electronic computing apparatus according to the at least one access relation comprised in the first group.

If the determination result of the step S209 is "Yes," step S215 (to be described later) is executed. If the determination result of the step S209 is "No," step S211 is executed. In step S211, the electronic computing apparatus provides the at least one access relation corresponding to the first group to an expert of network information security for determination. Then, in step S213, the electronic computing apparatus records that the attack pattern determined by the expert of network information security corresponds to the at least one access relation corresponding to the first group. Next, in step S215, the electronic computing apparatus determines whether any first group has not been analyzed. If the determination result of the step S215 is "Yes," the network attack pattern determination method repeats the steps S205 to S215 to analyze other first group(s). If the determination result of the step S215 is "No" (i.e., all the first groups have been analyzed), the network attack pattern determination method may be ended directly. However, step S217 may be further executed in some embodiments to store a sequence of the specific attack patterns corresponding to the first groups.

Figure 2B:
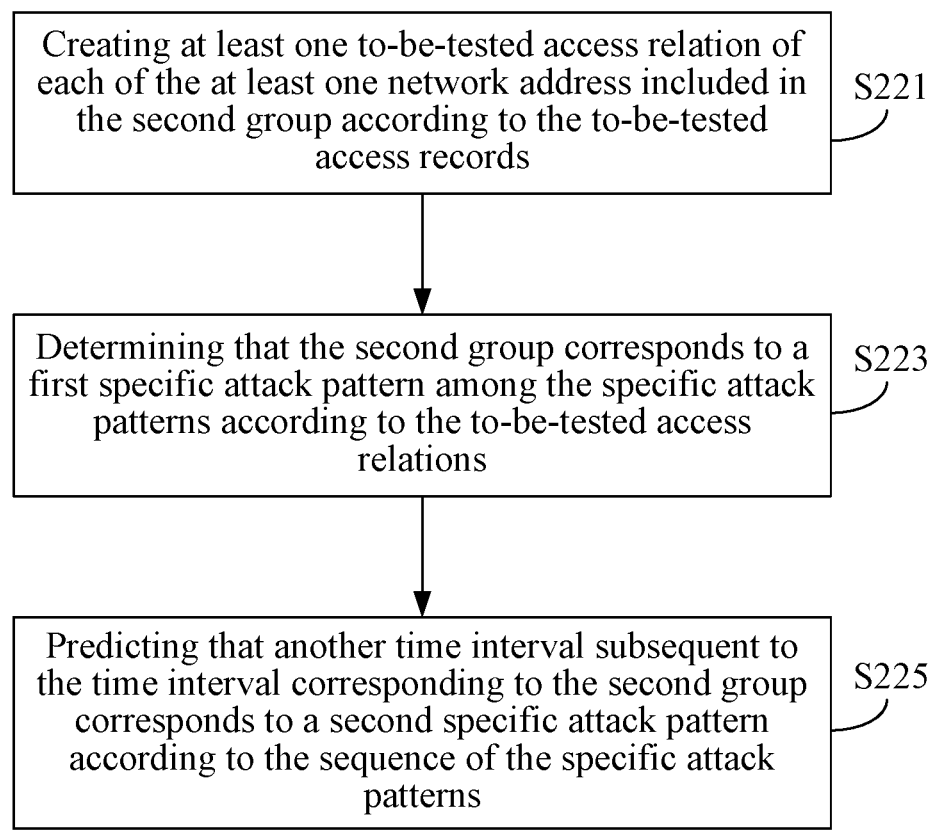
FIG. 2B illustrates the flowchart of some embodiments of the attacking node detection method according to the present invention.

In some embodiments, a process flow depicted in FIG. 2B may be further executed by the network attack pattern determination method to analyze a plurality of to-be-tested access records included in a second group. Each of the to-be-tested access records comprises a network address, a time stamp, and an access content. Similarly, in some embodiments, each of the access contents may be an HTTP request, an access status code, and/or a data access amount.

In step S221, the electronic computing apparatus creates at least one to-be-tested access relation for each of the at least one network address included in the second group according to the to-be-tested access records. Each of the at least one to-be-tested access relation is defined by one of the at least one network address included in the second group and one of the access contents of the to-be-tested access records included in the second group. In step S223, the electronic computing apparatus determines that the second group corresponds to a first specific attack pattern among the specific attack patterns (i.e., one of the specific attack patterns corresponding to the first groups determined in the step S209) according to the to-be-tested access relations. In step S225, the electronic computing apparatus predicts that another time interval subsequent to a time interval corresponding to the second group corresponds to a second specific attack pattern according to the sequence of the specific attack patterns.

In addition to the aforesaid steps, the second embodiment can also execute all the operations and steps of, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment, and thus will not be further described herein.

The network attack pattern determination method described in the second embodiment may be implemented by a computer program comprising a plurality of codes. The computer program is stored in a non-transitory computer readable storage medium. When the computer program is loaded into an electronic computing apparatus (e.g., the network attack pattern determination apparatus 1 of the first embodiment), the computer program executes the network attack pattern determination method described in the second embodiment. The non-transitory computer readable storage medium may be an electronic product, e.g., a read only memory (ROM), a flash memory, a floppy disk, a hard disk, a compact disk (CD), a mobile disk, a magnetic tape, a database accessible to a network or any other storage medium known to those of ordinary skill in the art and having the same functionality.

It shall be appreciated that, in the specification of the present invention, the terms "first" and "second" used in the first group and the second group are only intended to represent that these groups are determined in different stages. The terms "first," "second," and "third" used in the first attack access relation, the second attack access relation, and the third attack access relation are only intended to indicate that they are different attack access relations.

Accordingly, under conditions that at least one attack address is known, the network attack pattern determination technology (including the apparatus, the method and the non-transitory computer readable storage medium thereof) provided in the present invention retrieves a plurality of attack records related to the at least one attack address, divides the attack records into a plurality of groups, and compares access relations corresponding to each of the groups with attack access relations of the attack patterns. Through the aforesaid operations, the present invention can determine attack patterns corresponding to each group and even further predict attack patterns that will possibly occur in the future.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A network attack pattern determination apparatus, comprising:
   a storage unit, being stored with a plurality of attack patterns and a plurality of access records of a network node, each of the access records comprising a network address of a host, a time stamp of an access to the network node by the host, and an access content of the access to the network node by the host, each of the attack patterns corresponding to at least one attack access relation, and each of the at least one attack access relation being defined by one of the network addresses and one of the access contents; and
   a processing unit, being electrically connected to the storage unit and configured to retrieve a subset of the access records as a plurality of attack records according to at least one attack address, the network address comprised in each of the at least one attack records being one of the at least one attack address,
   wherein the processing unit further divides the attack records into a plurality of first groups according to the time stamps of the attack records and performs the following operations on each of the first groups:
      creating at least one access relation for each of the at least one attack address included in the first group according to the attack records included in the first group, each of the at least one access relation being defined by one of the at least one attack address included in the first group and one of the access contents of the attack records included in the first group,
      determining that the first group corresponds to a specific attack pattern among the attack patterns according to the at least one access relation corresponding to the first group,
   wherein the specific attack patterns corresponding to the first groups have a sequence of the specific attack patterns and the processing unit further stores the sequence of the specific attack patterns into the storage unit,
   wherein a second group includes a plurality of to-be-tested access records, and the processing unit further determines that the second group corresponds to a first specific attack pattern among the specific attack patterns according to a plurality of to-be-tested access relations of the to-be-tested access records, and
   wherein the second group corresponds to a time interval, and the processing unit further predicts that another time interval subsequent to the time interval corresponds to a second specific attack pattern according to the sequence of the specific attack patterns.

2. The network attack pattern determination apparatus of claim 1, wherein, each of the to-be-tested access records comprises a network address, a time stamp, and an access content, the processing unit further creates at least one to-be-tested access relation for each of the at least one network address included in the second group according to the to-be-tested access records, and each of the at least one to-be-tested access relation is defined by one of the at least one network address included in the second group and one of the access contents of the to-be-tested access records included in the second group.

3. The network attack pattern determination apparatus of claim 1, wherein each of the first groups corresponds to a time interval, each of the time intervals has a time length, and the time lengths are identical.

4. The network attack pattern determination apparatus of claim 1, wherein the first groups have a sequence, each of the first groups corresponds to a time interval, and a time span between any two adjacent first groups is greater than a threshold.

5. The network attack pattern determination apparatus of claim 1, wherein each of the access contents is one of a HyperText Transfer Protocol (HTTP) request, an access status code, a data access amount, and a combination thereof.

6. A network attack pattern determination method adapted for an electronic computing apparatus, the electronic computing apparatus being stored with a plurality of attack patterns and a plurality of access records of a network node, each of the access records comprising a network address of a host, a time stamp of an access to the network node by the host, and an access content of the access to the network node by the host, each of the attack patterns corresponding to at least one attack access relation, and each of the at least one attack access relation being defined by one of the network addresses and one of the access contents, and the network attack pattern determination method comprising:

retrieving a subset of the access records as a plurality of attack records according to at least one attack address, wherein the network address comprised in each of the attack records is one of the at least one attack address;

dividing the attack records into a plurality of first groups according to the time stamps of the attack records; and executing the following steps on each of the first groups:
creating at least one access relation for each of the at least one attack address included in the first group according to the attack records included in the first group, each of the at least one access relation being defined by one of the at least one attack address included in the first group and one of the access contents of the attack records included in the first group; and determining that the first group corresponds to a specific attack pattern among the attack patterns according to the at least one access relation corresponding to the first group, wherein the specific attack patterns corresponding to the first groups have a sequence of the specific attack patterns, a second group corresponds to a time interval and includes a plurality of to-be-tested access records, and the network attack pattern determination method further comprises the following steps:

storing the sequence of the specific attack patterns;

determining that the second group corresponds to a first specific attack pattern among the specific attack patterns according to a plurality of to-be-tested access relations of the to-be-tested access records; and predicting that another time interval subsequent to the time interval corresponds to a second specific attack pattern according to the sequence of the specific attack patterns.

7. The network attack pattern determination method of claim 6, wherein, each of the to-be-tested access records comprises a network address, a time stamp and an access content, the determination method further comprising:

creating at least one to-be-tested access relation of each of the at least one network address included in the second group according to the to-be-tested access records, wherein each of the at least one to-be-tested access relation is defined by one of the at least one network address included in the second group and one of the access contents of the to-be-tested access records included in the second group.

8. The network attack pattern determination method of claim 6, wherein each of the first groups corresponds to a time interval, each of the time intervals has a time length, and the time lengths are identical.

9. The network attack pattern determination method of claim 6, wherein the first groups have a sequence, each of the first groups corresponds to a time interval, and a time span between any two adjacent first groups is greater than a threshold.

10. The network attack pattern determination method of claim 6, wherein each of the access contents is one of a HyperText Transfer Protocol (HTTP) request, an access status code, a data access amount, and a combination thereof.

11. A non-transitory computer readable storage medium, having a computer program stored therein, the computer program executing an attacking node detection method after being loaded into an electronic computing apparatus, the electronic computing apparatus being stored with a plurality of attack patterns and a plurality of access records of a network node, each of the access records comprising a network address of a host, a time stamp of an access to the network node by the host, and an access content of the access to the network node by the host, each of the attack patterns corresponding to at least one attack access relation, each of the at least one attack access relation being defined by one of the network addresses and one of the access contents, and the network attack pattern determination method comprising:

retrieving a subset of the access records as a plurality of attack records according to at least one attack address, wherein the network address comprised in each of the attack records is one of the at least one attack address;

dividing the attack records into a plurality of first groups according to the time stamps of the attack records; and executing the following steps on each of the first groups:
creating at least one access relation for each of the at least one attack address included in the first group according to the attack records included in the first group, wherein each of the at least one access relation is defined by one of the at least one attack address included in the first group and one of the access contents of the attack records included in the first group; and determining that the first group corresponds to a specific attack pattern among the attack patterns according to the at least one access relation corresponding to the first group, wherein the specific attack patterns corresponding to the first groups have a sequence of the specific attack patterns, a second group corresponds to a time interval and includes a plurality of to-be-tested access records, and the network attack pattern determination method further comprises the following steps:

storing the sequence of the specific attack patterns;

determining that the second group corresponds to a first specific attack pattern among the specific attack patterns according to a plurality of to-be-tested access relations of the to-be-tested access records; and predicting that another time interval subsequent to the time interval corresponds to a second specific attack pattern according to the sequence of the specific attack patterns.

12. The non-transitory computer readable storage medium of claim 11, wherein, each of the to-be-tested access records comprises a network address, a time stamp, and an access content, and the network attack pattern determination method further comprises:

creating at least one to-be-tested access relation for each of the at least one network address included in the second group according to the to-be-tested access records, wherein each of the at least one to-be-tested access relation is defined by one of the at least one network address included in the second group and one of the access contents of the to-be-tested access records included in the second group.

13. The non-transitory computer readable storage medium of claim 11, wherein each of the first groups corresponds to a time interval, each of the time intervals has a time length, and the time lengths are identical.

14. The non-transitory computer readable storage medium of claim 11, wherein the first groups have a sequence, each of the first groups corresponds to a time interval, and a time span between any two adjacent first groups is greater than a threshold.

* * * * *